Patented July 10, 1928.

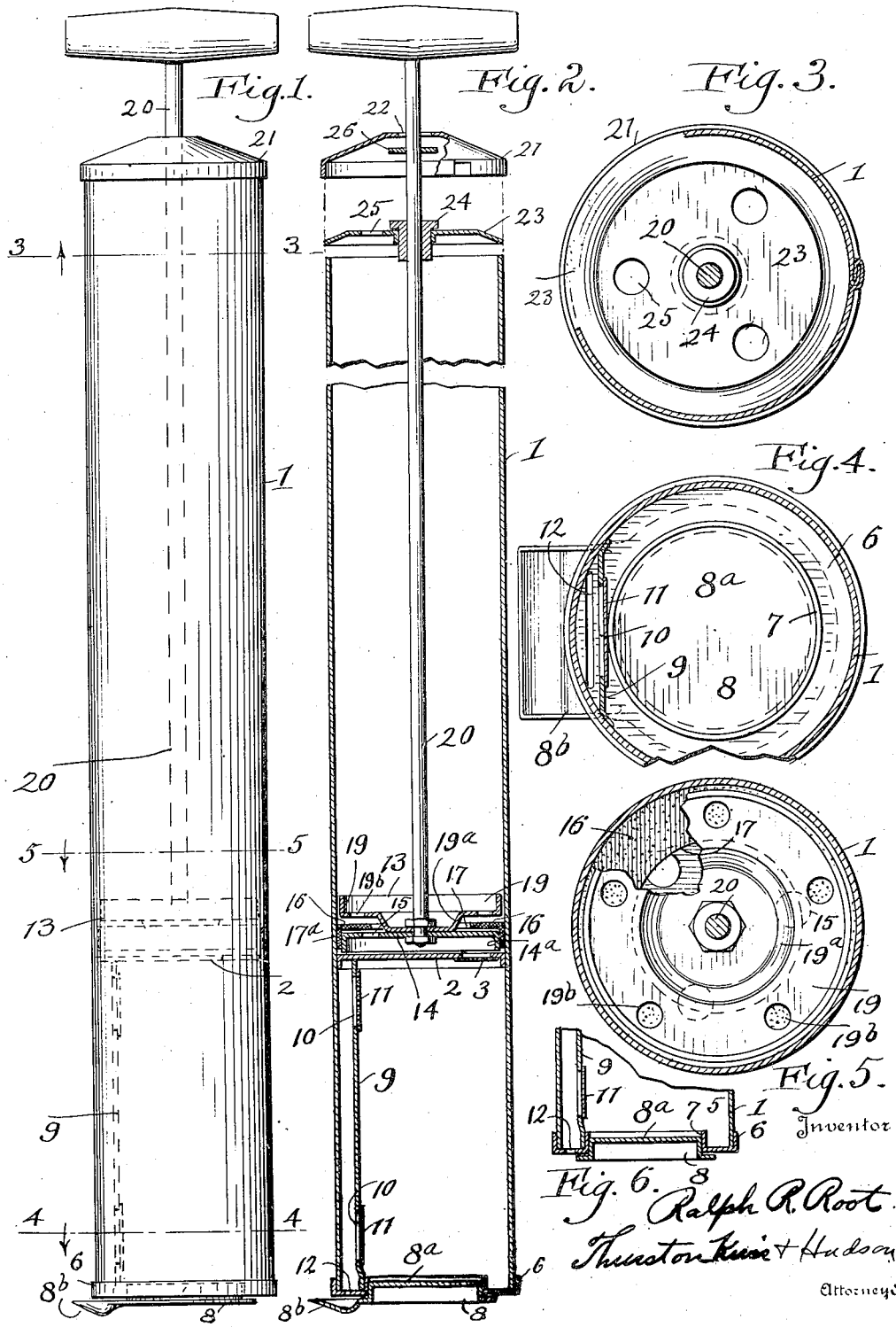

1,676,462

UNITED STATES PATENT OFFICE.

RALPH R. ROOT, OF LAKEWOOD, OHIO, ASSIGNOR TO THE ROOT MANUFACTURING COMPANY, OF CLEVELAND, OHIO, A CORPORATION OF OHIO.

POWDER-DISPENSING DEVICE.

Application filed February 25, 1925. Serial No. 11,615.

The present invention relates to an apparatus for dispensing powdery substance by which the powdered substance is forced from a container borne by an air current with which air current it is thoroughly mixed, and the powdered substance deposited in the place which it is desired to put it.

The object of the invention is to provide an apparatus which can be conveniently grasped in the hand of the user and operated by the other hand of the user. An additional object is to provide a construction in which the powdered substance may be conveniently stored and discharged either in a straight out direction, or may be controlled so that the air stream carrying the powdered substance may be deflected in an upward direction as may be desired when the upper side of plants are destroyed. Other objects of the invention will appear as the description proceeds.

Reference should be had to the accompanying drawings forming a part of this specification, in which Fig. 1 is an elevation of the device; Fig. 2 is a sectional view of the elevation with portions of the device shown in separated position to more adequately show their form and construction; Fig. 3 is a section upon the line 3—3 of Fig. 1; Fig. 4 is a section upon the line 4—4 of Fig. 1; Fig. 5 is a section upon the line 5—5 of Fig. 1; Fig. 6 is a fragmentary sectional elevation showing construction at one end of the dispensing device.

Referring to the drawings, 1 indicates a cylindrical tube. The tube at a portion between the ends thereof is provided with a fixed partition 2. This partition has a screened opening 3 through the same. The partition which has been described divides the tubular member 1 into two chambers which may be indicated at 4 and 5, the chamber 4 serves for the reception of a piston which will be later described, while the chamber 5 serves as a container for powdered substance which is to be dispensed. The fine mesh of the screen 3 will prevent any substantial amounts of the powdered substance from passing into the chamber 4. The open end of the tubular member 1 at the end of the chamber 5 is closed by a fixed cover 6 which has a central opening 7 which central opening is closed by means of a removable member 8, which has a depressed portion 8ª that fits within the opening 7, the co-operation of these members having a tight frictional fit which prevents their accidental separation but does not prevent their being pried apart. The removal of the member 8 will permit the insertion of the powdered material within the member 5. At one portion of the chamber 5 there is secured a strip 9 which is secured at one end to the partition 2, and at the opposite end is held in place by engagement with the inwardly extending lip forming the opening 7.

In the member 9 there are a plurality of openings 10 which are covered with screen like material, as indicated at 11. The passageway formed by the member 9 which co-operates with the cylindrical walls of the container 1 serves as an exit passage for powdery material which is forced under air pressure in a manner which will be subsequently described. The cover member 6 is provided with a slot outlet, as indicated at 12, through which the powdery material forced through the passage formed by the member 9, may find exit. The cap member 8 is provided with a curved lip extension 8ᵇ. When this cap member is so adjusted that the lip 8ᵇ is beneath the slot opening 12, then the powdery material which is ejected through the slot 12 will be deflected by the lip 8ᵇ causing it to move in an upward direction. On the other hand, in the event that the cap member 8 is adjusted to a position such that the lip 8ᵇ is not beneath the slot opening 12, then the powdery material will be ejected through the opening 12 and move in a straight downward direction, or at least will move undeflected. Such an arrangement is shown in Fig. 6 of the drawing. This structure enables the powder dispensing device to eject powder either straight ahead or to deflect it, and when the device is used with the deflector in position as previously described the powdery material may be ejected so as to contact with the object which is desired to dust from beneath the same, this being particularly advantageous in the dusting of under sides of leaves of plants, or in dusting objects having portions which are difficult of access.

The chamber 4 which is behind the partition 2 serves to house a plunger member, which is generally represented at 13, which plunger member is formed with a cupped member 14 having a plurality of spaced holes 15 formed therein. The cupped member 14 has an outer peripheral flange which is indicated at 14ª. Superimposed upon the member 14 is a rubber cup member 16. This cup member as stated may be made of rubber or equivalent material. It is provided with a central opening 17 and with a flanged portion 17ª. There is also a cup-shaped member 19 which has a central depressed portion 19ª, which centrally depressed portion is surrounded by the opening 17 in the rubber member 16. The cup-shaped member 19 and the cup-shaped member 14 are secured to each other at their central portion by means of a rod 20 which rod extends longitudinally through the chamber 4, as will be clearly seen from the drawings. The member 19 is also provided with openings 19$^b$ which are arranged in spaced relation with respect to each other. The cup-shaped members 14 and 19 are slightly less in diameter than the inside diameter of the container 1, and the rubber member 16 with its flange overlying the flange 14ª of the cup-shaped member 14 lies between the inner wall of the receptacle 1 and the flange 14ª.

The member 16 is unattached, and due to the enlarged opening 17 and the fact that the cup-shaped members 14 and 19 are spaced a slight distance apart, it will be seen that there is possibility of movement of the member 16 between the cup member 19 and the cup member 14. The enlarged central opening will also permit the passage of air in a manner which will be later described.

It will be noted that the openings 15 in the cup member 14 are not in line with the openings 19$^b$ in the cup member 19, and it will be seen that the central opening in the member 16 is such that it will not completely cover the opening 15, but on the other hand, the openings 19$^b$ are in such position that when the member 16 moves against the under side of the cup member 19 the openings 19$^b$ will be closed.

When the plunger 13 as a whole is drawn outwardly in the casing 1 air which is in the chamber 4 may pass through the opening 19$^b$ of the cup member 19 through the enlarged central opening 17 of the member 16, and through the opening 15 in the cup shaped member 14. During this movement there will be no suction produced on the material in the member 16, and therefore there will be practically no passage of powdery material from the chamber 5 into the chamber 4. Therefore, there is no likelihood of the powdery material in any way interfering with the reciprocation of the plunger.

When the plunger 13 as a whole has moved to the outer end of the casing 1, then the chamber 4 in the portion thereof between the plunger and the partition 2 will be filled with air, and upon the forward reciprocation of the plunger 13 the member 16 will move into contact with the under side of the cup-shaped member 19 thereby closing the openings 19$^b$, and under these conditions the air which is in front of the plunger 13 will be forced through the opening 3 into the chamber 5, and effectively eject the powdery material in a manner which will be well understood.

At the outer end of the casing 1 there is a closure member 21 which has a central opening 22 through which the rod 20 extends. Within the cover member 21 there is a plate 23 which is of such diameter that when the cover member 21 is secured in place upon the body 1 it will hold the plate 23 in position at the end of the container 1. The plate 23 has a central opening in which there is a bushing 24 through which the rod 20 extends. The plate 23 also has a plurality of openings such as indicated at 25 through which air may pass. Upon the rod 20 is a member 26 which is loosely applied upon the rod and is of greater diameter than the opening 22 in the member 21. This member 26 as will be seen lies above the bushing 24 and inside of the member 21. This member 26 is free to move upon the rod 20, but has sufficient frictional engagement so that it will move with the rod through a limited path of movement between the bushing 24 and the member 21. The construction which has been described acts as a valve for the admission of air to the inside of the casing 1. When the rod 20 is pulled outwardly and carries with it the plunger 13 the member 26 will be carried into contact with the under side of the member 21, thus closing the opening 22 so that air will not move outwardly through the opening 22, but on the contrary the air which is within the container 1 will pass through the openings 20 and 15 in the plunger member 13, as before described.

On the forward movement of the plunger 13 the member 26 will be carried away from the opening 22, and thus will permit air to flow inside of the container 1 and behind the plunger member 13.

At the end of the rod there is a handle 27 which may be grasped by the operator for the purpose of moving the plunger 13.

In devices of this character known in the trade as hand operated dusters or powder dispensers, it is from the commercial aspect necessary to produce a device which may be manufactured at low cost but which will nevertheless be efficient in its operation and produce a dispensing of powdery material in a satisfactory manner. In the present instance the parts of the apparatus as described fulfill all the requirements for a device of this character.

Having described my invention, I claim:—

1. In a device of the character described, the combination with a container having a chamber adapted to contain powdered material said chamber having a filling opening, a closure member for said filling opening said chamber being provided with a discharge opening, said closure member being provided with an extension adapted to co-operate with the said discharge opening to deflect the material coming therefrom said extension being movable to a position in which it is out of co-operation with the said discharge opening.

2. In a device of the character described, the combination with a container having a partition thereby forming two chambers, one of said chambers being adapted to contain pneumatic forcing mechanism the other of said chambers being adapted to contain a powdered material, said partition having an opening therein, a partition member in the chamber containing the powdered material being fastened at one end to the partition dividing the container into two chambers, said partition member forming a passageway, a cap member forming a closure for the outer end of the chamber containing the powdered material, said cap member having a central opening with an inturned flange said partition member co-operating with said flange to hold the opposite end of the partition member, said partition member being formed with a plurality of openings therethrough, a discharge opening in said cap and communicating with said passageway, a cover co-operating with the said closure member said cover having a depressed portion adapted to co-operate with the inturned flange in the closure member.

3. In a device of the character described, the combination with a container having a partition thereby forming two chambers, one of said chambers being adapted to contain pneumatic forcing mechanism the other of said chambers being adapted to contain a powdered material, said partition having an opening therein, a partition member in the chamber containing the powdered material being fastened at one end to the partition dividing the container into two chambers, a cap member forming a closure for the outer end of the chamber containing the powdered material, said cap member having a central opening with an inturned flange said partition member co-operating with said flange to hold the outer end of the partition member, said partition member being formed with a plurality of openings therethrough, a cover co-operating with the said closure member said cover having a depressed portion adapted to co-operate with the inturned flange in the closure member, said cover member being provided with an extension, the said container being provided with a discharge opening, the said extension on the cover being movable to a position to co-operate with the discharge opening to deflect the material forced therethrough and also being movable to a position to leave the discharge opening unobstructed.

In testimony whereof I hereunto affix my signature.

RALPH R. ROOT.